United States Patent
Simpson et al.

(10) Patent No.: US 8,413,050 B2
(45) Date of Patent: Apr. 2, 2013

(54) INFORMATION ENTRY MECHANISM FOR SMALL KEYPADS

(75) Inventors: Todd G. Simpson, Calgary (CA); Roland E. Williams, Pleasant Hill, CA (US); Robert B. O'Dell, Oakland, CA (US)

(73) Assignee: Zi Corporation of Canada, Inc., Calgary (CA)

( * ) Notice: Subject to any disclaimer, the term of this patent is extended or adjusted under 35 U.S.C. 154(b) by 676 days.

(21) Appl. No.: 12/619,608

(22) Filed: Nov. 16, 2009

(65) Prior Publication Data

US 2010/0121876 A1 May 13, 2010

Related U.S. Application Data

(63) Continuation of application No. 10/360,541, filed on Feb. 5, 2003, now abandoned.

(51) Int. Cl.
*G06F 17/00* (2006.01)
(52) U.S. Cl. .......... 715/261; 715/259; 715/271
(58) Field of Classification Search .......... 715/261
See application file for complete search history.

(56) References Cited

U.S. PATENT DOCUMENTS

| | | |
|---|---|---|
| 3,978,508 A | 8/1976 | Vilkomerson |
| 4,244,000 A | 1/1981 | Ueda et al. |
| 4,268,815 A | 5/1981 | Eventoff et al. |
| 4,276,538 A | 6/1981 | Eventoff et al. |
| 4,337,665 A | 7/1982 | Sato et al. |
| 4,339,806 A | 7/1982 | Yoshida |
| 4,438,505 A | 3/1984 | Yanagiuchi et al. |
| 4,459,049 A | 7/1984 | Howell et al. |
| 4,760,528 A | 7/1988 | Levin |
| 4,954,956 A | 9/1990 | Yamakawa et al. |
| 4,965,415 A | 10/1990 | Young et al. |
| 5,109,352 A | 4/1992 | O'Dell |
| 5,333,272 A | 7/1994 | Capek et al. |
| 5,387,803 A | 2/1995 | Kurtz et al. |
| 5,455,203 A | 10/1995 | Koseki et al. |
| 5,528,235 A | 6/1996 | Lin et al. |
| 5,569,626 A | 10/1996 | Kurtz et al. |

(Continued)

FOREIGN PATENT DOCUMENTS

| | | |
|---|---|---|
| DE | 19640068 A1 | 4/1998 |
| DE | 19859644 A1 | 12/1998 |

(Continued)

OTHER PUBLICATIONS

"Paranormal News—GPS Cell Phone Tracking Used on Errant Lovers" from www.cosmiverse.com, dated Sep. 11, 2001.

(Continued)

*Primary Examiner* — Alvin Tan
(74) *Attorney, Agent, or Firm* — Michael A. Glenn; Glenn Patent Group

(57) ABSTRACT

Presentation of results of a predictive analysis of text is delayed until entry of the text by a user is paused by a particular amount of time. The results are available for selection by the user for another particular amount of time. After the other particular amount of time is expired, the results are no longer available to for selection. If a particular result is selected, the selected result either replaces or supplements the entered text.

5 Claims, 11 Drawing Sheets

U.S. PATENT DOCUMENTS

| | | | |
|---|---|---|---|
| 5,786,776 A | 7/1998 | Kisaichi et al. | |
| 5,802,911 A | 9/1998 | Cahill et al. | |
| 5,805,911 A | 9/1998 | Miller | |
| 5,818,437 A | 10/1998 | Grover et al. | |
| 5,896,321 A * | 4/1999 | Miller et al. | 365/189.15 |
| 5,945,928 A | 8/1999 | Kushler et al. | |
| 5,953,541 A | 9/1999 | King et al. | |
| 5,994,655 A | 11/1999 | Tsai | |
| 6,011,554 A | 1/2000 | King et al. | |
| 6,040,541 A | 3/2000 | Li | |
| 6,064,020 A | 5/2000 | Yamada et al. | |
| 6,068,416 A | 5/2000 | Kumamoto et al. | |
| 6,072,134 A | 6/2000 | Sato et al. | |
| 6,080,941 A | 6/2000 | Yokobori | |
| 6,107,584 A | 8/2000 | Yoneyama | |
| 6,118,092 A | 9/2000 | Hayashi et al. | |
| 6,133,536 A | 10/2000 | Hunag et al. | |
| 6,133,539 A | 10/2000 | Yao | |
| 6,140,595 A | 10/2000 | Yao | |
| 6,153,843 A | 11/2000 | Date et al. | |
| 6,156,986 A | 12/2000 | Tsai | |
| 6,168,330 B1 | 1/2001 | Okada et al. | |
| 6,180,048 B1 | 1/2001 | Katori | |
| 6,180,900 B1 | 1/2001 | Horiuchi | |
| 6,196,738 B1 | 3/2001 | Shimizu et al. | |
| 6,257,782 B1 | 7/2001 | Maruyama et al. | |
| 6,259,049 B1 | 7/2001 | Nakai | |
| 6,265,677 B1 | 7/2001 | Chao | |
| 6,268,578 B1 | 7/2001 | Nakai | |
| 6,307,548 B1 | 10/2001 | Flinchem et al. | |
| 6,864,809 B2 | 3/2005 | O'Dell et al. | |
| 7,098,896 B2 * | 8/2006 | Kushler et al. | 345/168 |
| 7,149,550 B2 | 12/2006 | Kraft et al. | |
| 7,155,683 B1 * | 12/2006 | Williams | 715/816 |
| 7,177,797 B1 * | 2/2007 | Micher et al. | 704/9 |
| 7,325,194 B2 * | 1/2008 | Moore et al. | 715/255 |
| 7,707,496 B1 * | 4/2010 | Moore et al. | 715/254 |
| 2002/0183100 A1 | 12/2002 | Parker | |
| 2006/0190819 A1 * | 8/2006 | Ostergaard et al. | 715/534 |
| 2006/0236249 A1 * | 10/2006 | Weissman | 715/752 |

FOREIGN PATENT DOCUMENTS

| | | |
|---|---|---|
| DE | 10058492 A1 | 8/2001 |
| EP | 1031913 | 8/2000 |
| EP | 1118837 A2 | 7/2001 |
| JP | 6133570 | 2/1986 |
| JP | 63284655 A * | 11/1988 |
| JP | 4207658 | 7/1992 |
| JP | 09243395 | 9/1997 |
| JP | 1117825 | 1/1999 |
| WO | WO 00/13036 A1 | 3/2000 |

OTHER PUBLICATIONS

MacKenzie, et al.; "Letterwise: Prefix-based Disambiguation for Mobile Text Input"; Nov. 2001; ACM Press, Symposium on User Interface Software and Technology—Session: Papers: On the move, pp. 111-120.

Sifverberg, et al.; "Predicting Text Entry Speed on Mobile Phones"; Apr. 2000; ACM Press, Conference on Human Factors in Computing Systems (SIGCHI), pp. 9-16.

* cited by examiner

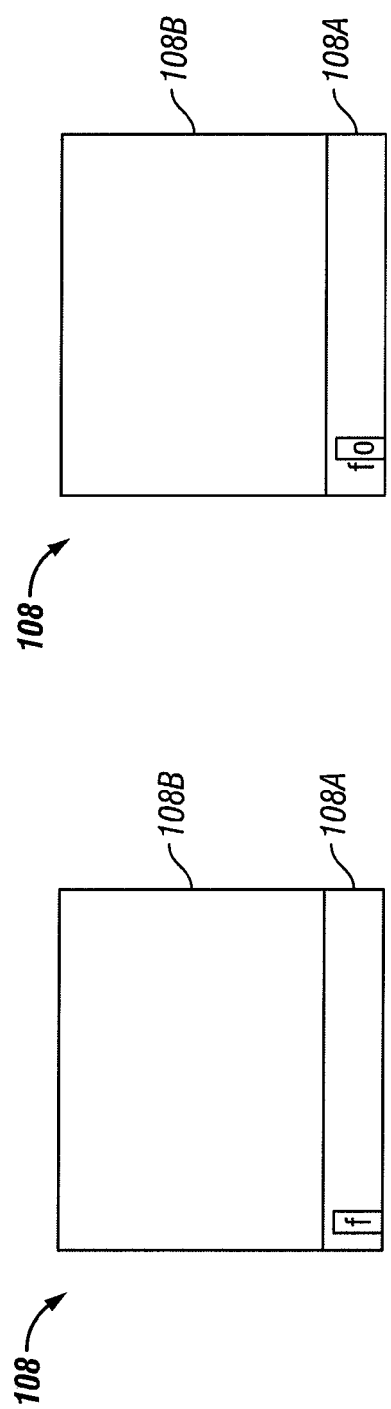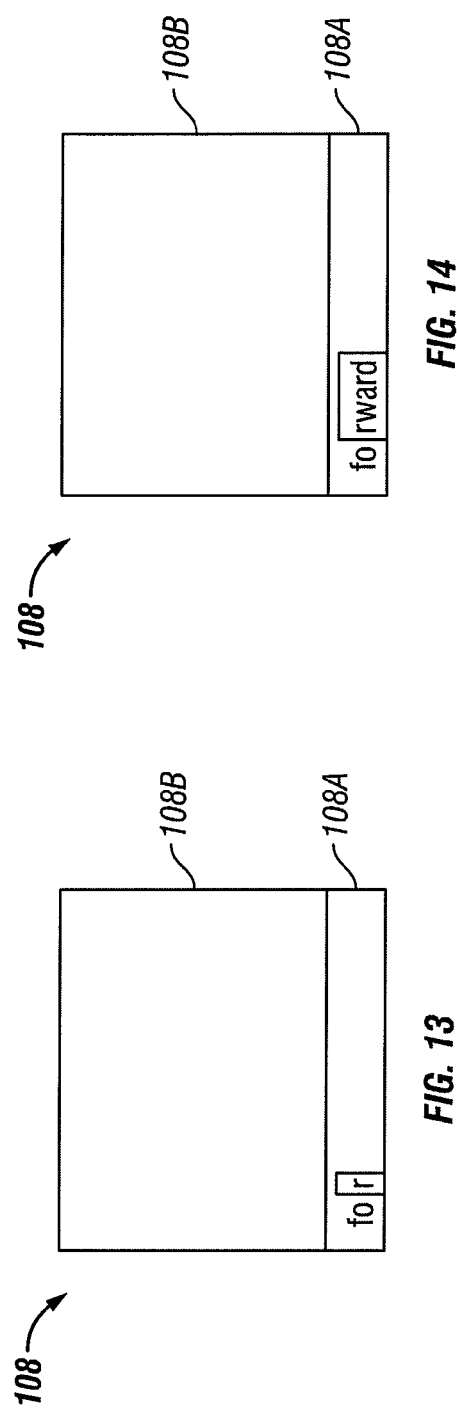

INFORMATION ENTRY MECHANISM FOR SMALL KEYPADS

CROSS-REFERENCE TO RELATED APPLICATIONS

This application is a continuation of the following application, and claims the benefit thereof in accordance with 35 USC 120: U.S. Application No. 10/360,541 entitled INFORMATION ENTRY MECHANISM FOR SMALL KEYPADS, filed on 2-5-2003 now ababdoned in the name of Todd G. Simpson. We hereby incorporate the entirety of the foregoing application by reference.

FIELD OF THE INVENTION

This invention relates to the field of information entry in electronic devices, and more specifically to a mechanism which is both efficient and intuitive to the user for entering information in a reduced keypad.

BACKGROUND OF THE INVENTION

The dramatic increase of popularity of the Internet has led to a corresponding dramatic rise in the popularity of textual communications such as e-mail and instant messaging. Increasingly, browsing of the World Wide Web of the Internet and textual communications are being performing using reduced keypads such as those found on mobile telephones.

Multi-tap systems provide usable but less than convenient text entry functionality for users of the Roman or similar alphabet. Briefly, multi-tap systems determine a number of repeated presses of a key to disambiguate multiple letters associated with a single key. For example, pressing the "2" key once represents the letter "a;" pressing the "2" key twice represents the letter "b;" pressing the "2" key thrice represents the letter "c;" and pressing the "2" key four (4) times represents the numeral "2." The number of presses of a particular key is typically delimited with a brief pause. While feasible, entering textual data of the Roman alphabet using multi-tap is cumbersome and time-consuming.

Some attempts have been made to use predictive interpretation of key presses to disambiguate multiple written symbols associated with individual keys. Such predictive interpretation is described by Zi Corporation on the World Wide Web and in U.S. Pat. No. 5,109,352 to Robert B. O'Dell (hereinafter the O'Dell Patent). Predictive interpretation is generally effective and greatly simplifies text input using reduced keypads with very large collections of written symbols. However, predictive interpretation has difficulty with words used in proper nouns, slang, and neology as such words might not be represented in a predictive database.

Despite its great efficiency, predictive interpretation of key presses for disambiguation provides a somewhat less than intuitive user experience. In particular, predictive interpretation, lacks accuracy until a few characters have been specified. The following example is illustrative.

Consider that a user is specifying the word "forest" using a numeric telephone keypad. In predictive interpretation, the user presses the following sequence of keys: 3-6-7-3-7-8. It should be appreciated that entering "forest" using multi-tap is significantly more cumbersome, pressing 3-3-3-6-6-6-7-7-7-3-3-7-7-7-7-8. Entry of text in which two or more consecutive letters are presented by the same key is exacerbated by the need to pause for a period of time between specifying each such letter to delimit the respective letter. In predictive interpretation, pressing "3" by the user does not necessarily interpret and display "f" as the indicated letter. Instead, an "e" or a "d" could be displayed to the user as the interpretation of the pressing of the "3" key. In some predictive interpretation implementations, the entire predicted word is displayed to the user. Since numerous words begin with any of the letters d, e, or f, it is rather common that the predicted word is not what the user intends to enter. Thus, as the user presses the "3" key to begin spelling "forest," an entirely different word such as "don't" can be displayed as a predicted word.

As the user presses the second key in spelling "forest," namely, the "6" key, some word other than "forest" can continue to be displayed as the predicted word. What can be even more confusing to the user is that the predict word can change suddenly and dramatically. For example, pressing the "6" key can change the predicted word from "don't" to "eminently"—both of which are spelled beginning with the "3" key followed immediately by the "6" key—depending upon frequency of usage of those respective words. To obtain full efficiency of predictive interpretation systems, the user continues with the remainder of the sequence—finishing with 7-3-7-8. Once the full sequence is entered, only one word—or just a few words—match the entered sequence. However, until that point is reached, the user is required to place faith and trust that the predictive interpretation will eventually arrive at the correct interpretation notwithstanding the various displayed incorrect interpretations early in the spelling of the desired word.

What is needed is an improved mechanism for efficiently disambiguating among multiple symbols associated with individual keys of a reduced keypad while continuing to provide accurate and reassuring feedback to the user.

SUMMARY OF THE INVENTION

In accordance with the present invention, display of results of predictive interpretation of key presses is postponed for a period of time such that a user entering multiple characters is not interrupted with repeated guesses as to what the user is intending to enter. Specifically, predictive analysis begins immediately following pressing of a key by the user, but results of such analysis are not displayed until at least a predetermined amount of time, e.g., 0.5 seconds, has elapsed since the last key press by the user. Accordingly, the user's experience in entering data is substantially enhanced.

It is helpful to consider the illustrative example of specifying "deforestation" using a reduced keypad. In accordance with the present invention, the user specifies "defo" unambiguously. During the entry of these first four characters, the user does not pause longer than the predetermined period of time. Accordingly, the user does not see any predicted candidates for the intended data. While predictive analysis was performed immediately following specification of each character, no results of such analysis were ever displayed to interrupt or confuse the user.

After specifying "defo," the user pauses for at least the predetermined period of time. The user is most likely to pause if the user becomes somewhat confused as to which key to press next or if the user has determined that a sufficient number of characters have been specified that predictive analysis can produce accurate results. In either case, presentation of predicted candidates of the user's intended data is a welcome event. Since the user has paused for at least the predetermined amount of time, results of predictive analysis are presented to the user.

It is also advantageous that the user does not wait indefinitely for results of predictive analysis. Therefore, if results of predictive analysis are not available by no less than a second predetermined amount of time from the last key press, e.g., 2.0 seconds, no predicted candidates of the user's intended data are presented to the user. It is preferred that some characteristic of the display is changed to indicate to the user that predicted candidates are not forthcoming. For example, a blinking cursor can indicate that predictive analysis is under way while a transition from a blinking cursor to a solid cursor indicates that predictive candidates are not available.

In addition, the availability of predictive candidates can be indicated to the user, either immediately or upon elapsing of the predetermined amount of time. The user can request display of any available predicted candidates by making a user input gesture so indicating. For example, a word being entered by the user can be highlighted, e.g., with a dotted underline, to indicate that predicted candidates for completion of the word are available and a soft key can be labeled to indicate that pressing the soft key causes display of available predicted candidates. Thus, display of results of predictive analysis of user input data can be explicitly requested by the user.

To ensure that results of predictive analysis are thorough and complete prior to presentation to the user, such results can be considered available only when resources for predicted candidates have been thoroughly and completely processed. Alternatively, partial results of predictive analysis can be considered available while predictive analysis continues and adds to the already available partial results until processing is terminated at the elapsing of the second predetermined amount of time from the last key press.

In addition, the same advantages can be realized on full-size keyboards. Some word processors—such as StarOffice from Sun Microsystems of Palo Alto, Calif., and OpenOffice from the OpenOffice.org community of which Sun Microsystems is a member—include a word completion feature which can present predictive candidates to the user as the user types a partial word. By only displaying predicted candidates to the user when the user has paused for a predetermined amount of time, such word processors would not quickly flash predicted candidates to the user as the user continues to type, thereby avoiding a somewhat annoying experience for the user.

These advantages are also applicable to non-textual data. For example, predicted candidates of contact records, images, sounds, and data files can be presented to the user without interrupting the user by waiting for a predetermined amount of time from the last user input gesture, e.g., key press, before presenting such candidates. In some contexts, multiple data types can be active and it is possible that the user partially specifies a number of data records of more than one of the active data types. In this case, the user is presented with representations of each data type, e.g., icons, from which the user selects an intended data type. Then, predicted candidates of the selected data type are presented to the user for selection.

BRIEF DESCRIPTION OF THE DRAWINGS

FIGS. 11-14 show a display of mobile telephone presenting predictive results and selection by a user.

DETAILED DESCRIPTION

In accordance with the present invention, display of results of predictive interpretation of user input gestures is postponed for an interval of time. The user is permitted to continue entry of data without interruption during the interval of time. The user is therefore not distracted while entering such data. Predicted candidates are only displayed to the user after a pause in user input gestures of at least a predetermined minimum duration. Such a pause is presumed to indicate that the user is either puzzled or intentionally awaiting predicted candidates.

Figure 1:
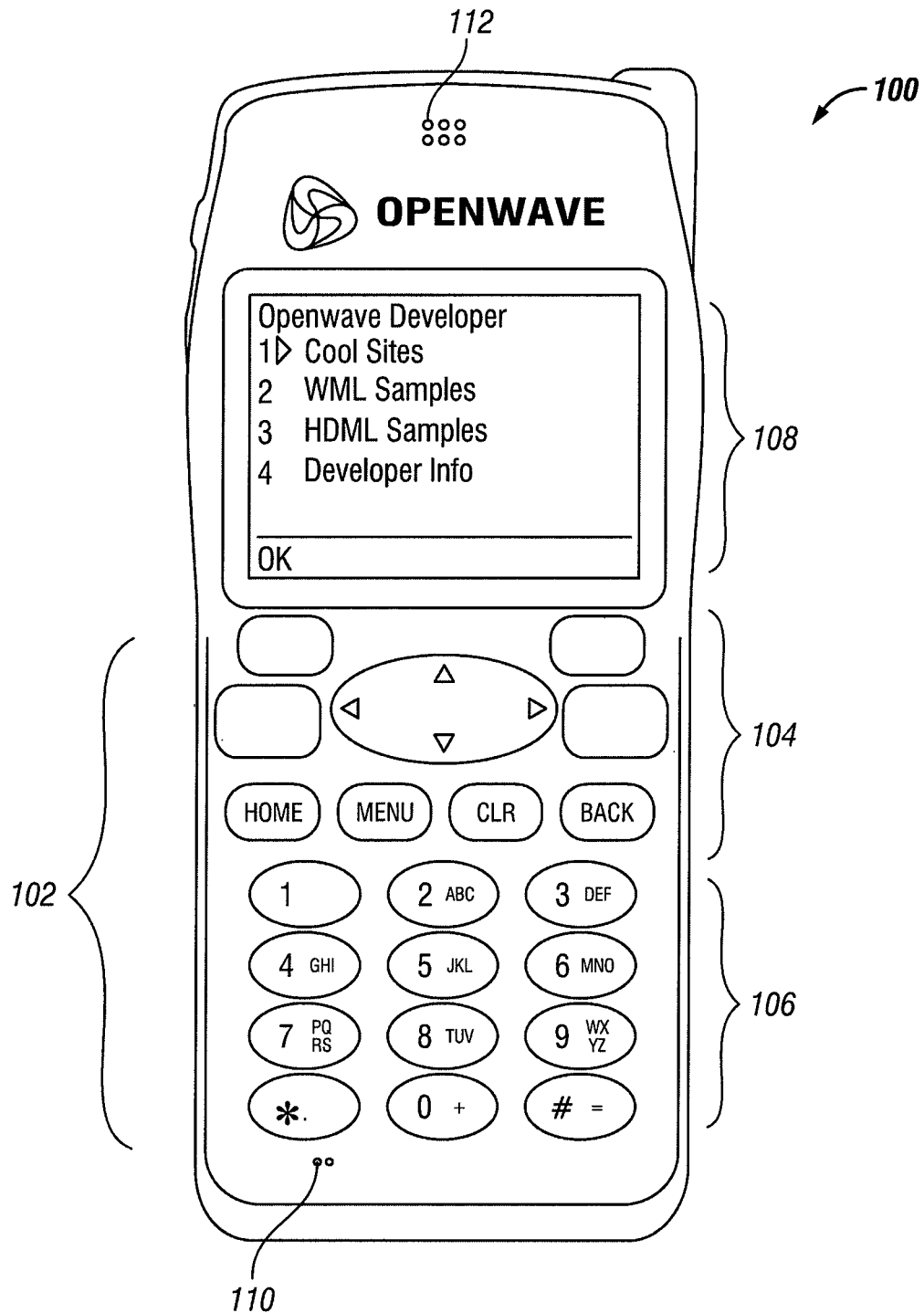
FIG. 1 shows a mobile telephone which is used for textual communication.

FIG. 1 shows a mobile telephone 100 which is used for textual communication. For example, mobile telephone 100 can be used to send and receive textual messages and/or can be used to browse the ubiquitous World Wide Web according to the known and standard Wireless Application Protocol (WAP). Mobile telephone 100 can also be used, in this illustrative embodiment, to send text messages according to the currently available and known Short Message Service (SMS). Of course, other types of devices with reduced keypads are used to enter data for purposes other than communications. Text entry in mobile telephone 100 is merely an illustrative embodiment. Mobile telephone 100 includes a keypad 102 which includes both command keys 104 and data input keys 106. In addition, mobile telephone 100 includes a display screen 108 for display of text and/or graphical information. Mobile telephone 100 also includes a microphone 110 for receiving audio signals and a speaker 112 for presenting audio signals to a user.

Data input keys 106, which are sometimes referred to herein collectively as numeric keypad 106, are arranged in the typical telephone keypad arrangement as shown. While numeric keypad 106 is described herein as an illustrative example of a reduced keypad, it should be appreciated that the principles of the present invention are applicable to other reduced keypads. As used herein, a reduced keypad is a keypad in which one or more keys can each be used to enter one of a group of two of more symbols. For example, the letters "a," "b," and "c" are associated with, and specified by a user pressing, the "2" key of numeric keypad 106.

Figure 2:
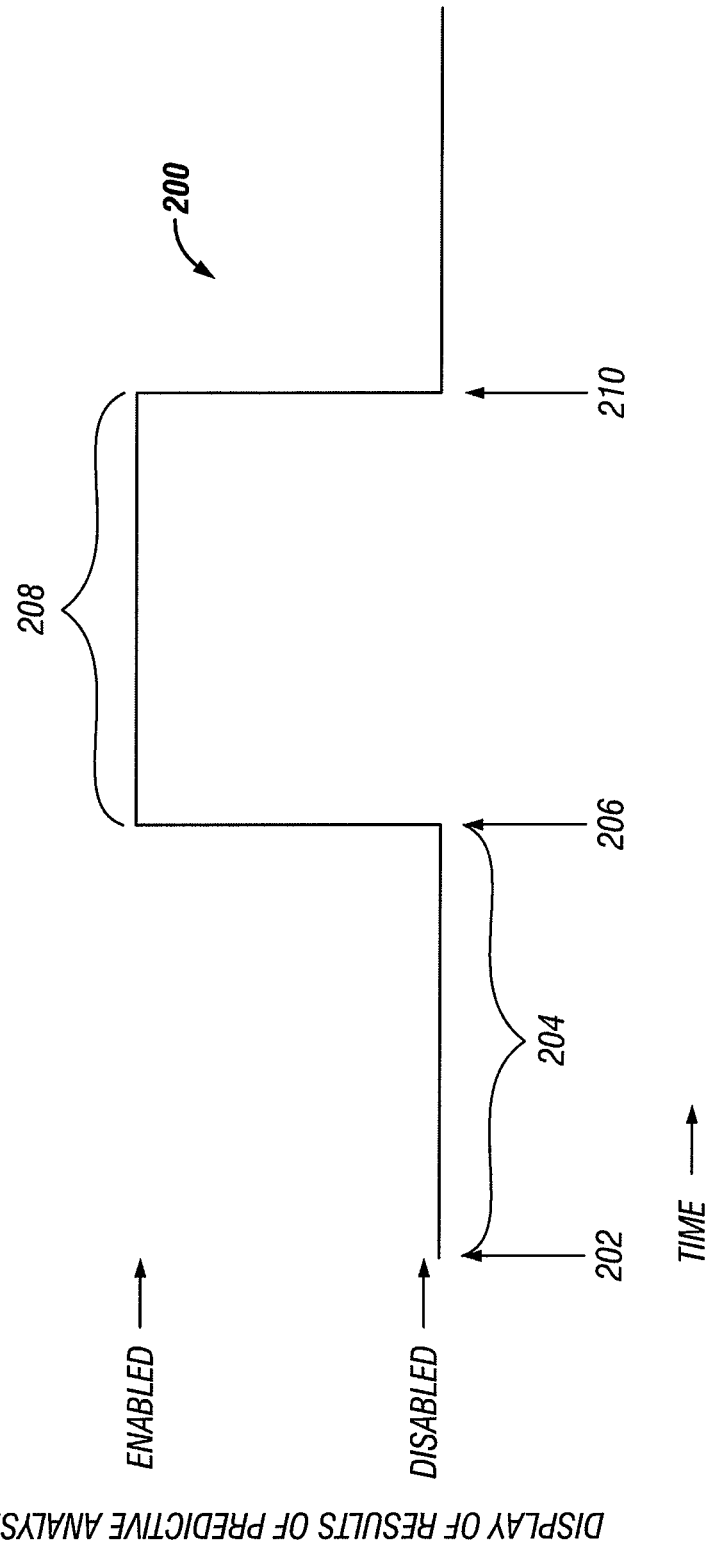
FIG. 2 shows a diagram of a timeline of information entry in a mobile telephone.

FIG. 2 shows a timing diagram 200 which illustrates the display of predicted candidates resulting from predictive analysis in accordance with the present invention. Time 202 represents a time at which the user has most recently pressed any of data input keys 106. Until time 206, i.e., during time interval 204, display of any predicted candidates for text intended to be entered by the user is suppressed. If the user presses any of data input keys 106 during time interval 204, the user sees no predicted results, and timing diagram 200 is reset to time 202. Accordingly, the user can continue entering text in a conventional manner, e.g., using an unambiguous text entry mechanism such as multi-tap, without interruption as long as the user does not pause for the entire duration of time interval 204.

However, if the user has paused for the duration of time interval 204, i.e., no key press is detected at time 206 relative to the most recent key press, display of predicted candidates resulting from predictive analysis is enabled at time 206. A few things are worth noting at this point. First, predictive analysis begins immediately upon pressing of any of data input keys 106, i.e., at time 202. Second, it is possible that predictive analysis completes prior to time 206. If so, presentation of the resulting predicted candidates to the user is suppressed during time interval 206. However, availability of predicted candidates can be indicated to the user in a preferably subtle and non-disruptive manner. Third, it is also possible that predictive analysis does not complete by time 206. In this case, predictive analysis continues. In this illustrative embodiment, display 108 is modified at time 206 if predictive analysis continues. For example, the cursor can change from a steady state to a blinking state. Such notifies the user that mobile telephone 100 is analyzing data entered by the user thus far to predict a larger portion of data intended by the user. For example, given a few letters entered by the user, a blinking cursor can indicate to the user that mobile telephone 100 is processing those letters to predict an intended word or phrase.

Predicted candidates can also be made available to the user prior to completion of predictive analysis. For example, such partial results can be indicated to the user as available prior to time 206 and can be presented to the user while predictive analysis continues during time interval 208.

If predictive analysis produces one or more predicted candidates for the data intended by the user, those predicted candidates are presented to the user for browsing and selection. In this illustrative embodiment, the user uses command keys 104 to browse among two or more predicted candidates displayed in display 108 and to select as predicted candidate as the intended data. For example, if the predicted candidates represent words and/or phrases of a text message, selecting a candidate causes the predicted word or phrase to be included in a message which is currently being composed by the user. The user is also permitted to ignore the displayed predicted candidates and to continue using data input keys 106 to enter data. Pressing any of data input keys 106 during time interval 208, regardless of whether predicted candidates are displayed in display 108, causes timing diagram to reset at time 202.

Since all good things must come to an end, predictive analysis is only permitted to continue for a limited amount of time in this illustrative embodiment. Accordingly, predictive analysis terminates at time 210, i.e., at the end of time interval 208. If predictive analysis has not produced predicted candidates by time 210, no predicted candidates are presented to the user. In this illustrative embodiment, display 108 is again modified to indicate to the user that predictive analysis terminated without producing useful predicted candidates, e.g., by changing the cursor from a blinking state back to a steady state. The user therefore does not wait endlessly for predictive analysis if no results are forthcoming. In this illustrative embodiment, time 210 is two (2) seconds from time 202. In another embodiment, time 210 does not exist or is set to such a large amount of time that predictive analysis doesn't terminate during data entry by the user. The user can always terminate predictive analysis, even if such analysis goes on for a considerable amount of time, by continuing to enter data by pressing any of data input keys 106.

After time 210, the user continues to enter data normally, i.e., without the assistance of predictive analysis. Such can include pressing any of data input keys 106 to continue specifying a character or pressing one or more of control keys 104 to indicate that a complete unit, e.g., a word or phrase, has been successfully specified. In the former case, pressing any of data input keys 106 restarts the behavior of mobile telephone 100 represented in timing diagram 200. In particular, pressing any of data input keys 106 subsequent to time 210 resets at time 202 such that predictive candidates are presented to the user after a subsequent occurrence of time 206, i.e., in a subsequent instance of timing diagram 200.

The result of displaying predicted candidates in the manner described in conjunction with timing diagram 200 is that predictive analysis of data entry in reduced keypads is much more comfortable and palatable to the user. Specifically, the user continues to enter data at a reasonable pace without interruption so long as the user does not pause for the duration of time-interval 204. At some point in time, the user may be confused as to which key to press next or may believe that sufficient data has been entered such that predictive analysis can make a very accurate guess as to the entire word, phrase, or data element intended by the user. Accordingly, the user pauses for the duration of time-interval 204 and predicted candidates are displayed after time 206 to the user for browsing and selection. If the user was confused, the predicted candidates can be very helpful. If the user was hoping to see predicted candidates, then mobile telephone 100 behaves exactly as the user intends. In either case, presentation of the predicted candidates is a positive experience for the user and not at all annoying.

Figure 3:
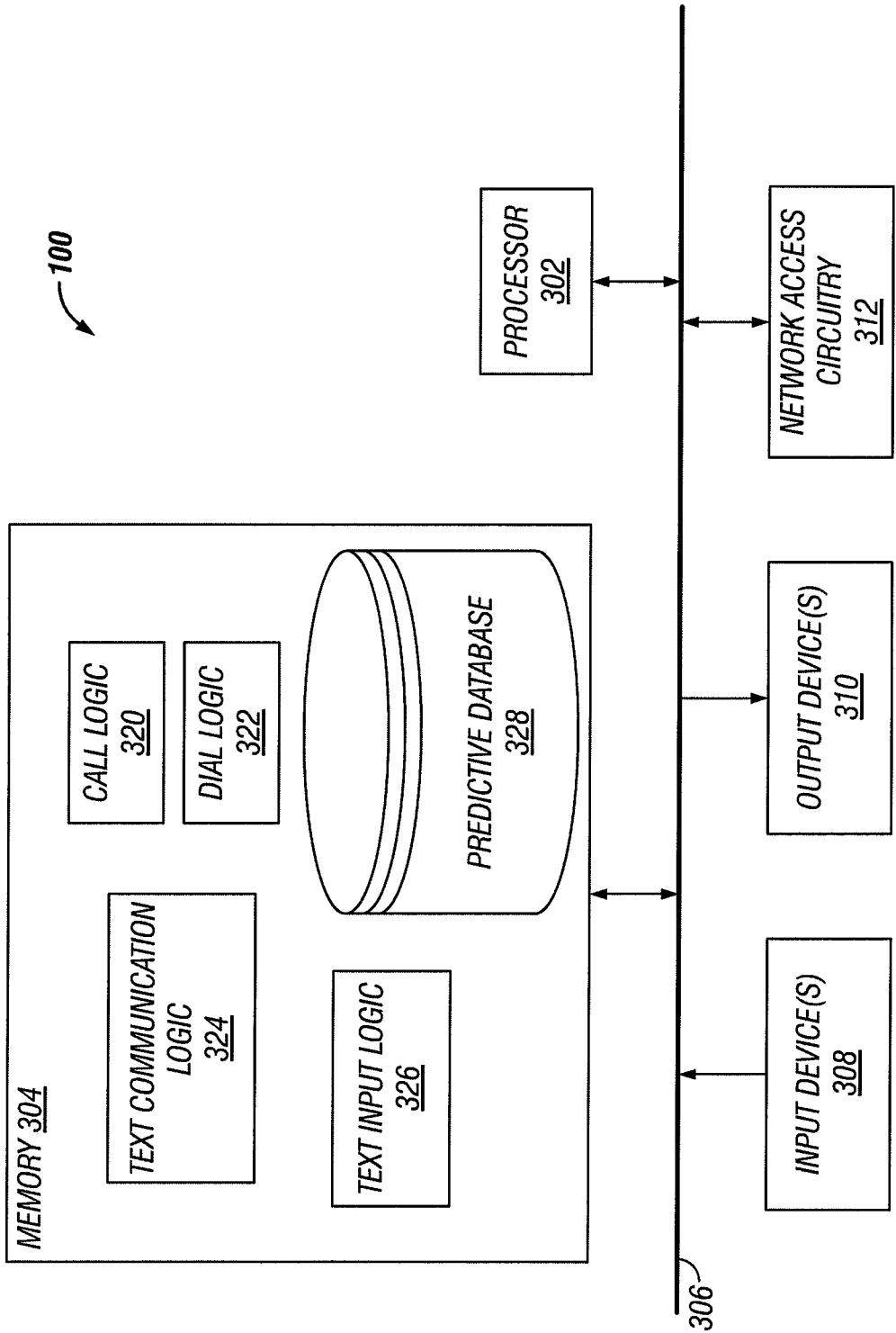
FIG. 3 shows a block diagram of the mobile telephone which is used for textual communication.

Some elements of mobile telephone 100 are shown in diagrammatic form in FIG. 3. Mobile telephone 100 includes a microprocessor 302 which retrieves data and/or instructions from memory 304 and executes retrieved instructions in a conventional manner.

Microprocessor 302 and memory 304 are connected to one another through an interconnect 306 which is a bus in this illustrative embodiment. Interconnect 306 is also connected to one or more input devices 308, one or more output devices 310, and network access circuitry 312. Input devices 308 include, for example, keypad 102 (FIG. 1) and microphone 110. In alternative embodiments, input devices 308 (FIG. 3) can include other types of user input devices such as touch-sensitive screens, for example. Output devices 310 include display 108 (FIG. 1), which is a liquid crystal display (LCD) in this illustrative embodiment, and speaker 112 for playing audio received by mobile telephone 100 and a second speaker for playing ring signals. Input devices 308 and output devices 310 can also collectively include a conventional headset jack for supporting voice communication through a convention headset. Network access circuitry 312 includes a transceiver and an antenna for conducting data and/or voice communication through a network.

Call logic 320 includes a collection of instructions and data which define the behavior of mobile telephone 100 in communicating through network access circuitry 312 in a conventional manner. Dial logic 322 includes a collection of instructions and data which define the behavior of mobile telephone 100 in establishing communication through network access circuitry 312 in a conventional manner. Text communication logic 324 includes a collection of instructions and data which define the behavior of mobile telephone 100 in sending and receiving text messages through network access circuitry 312 in a conventional manner.

Figure 10:
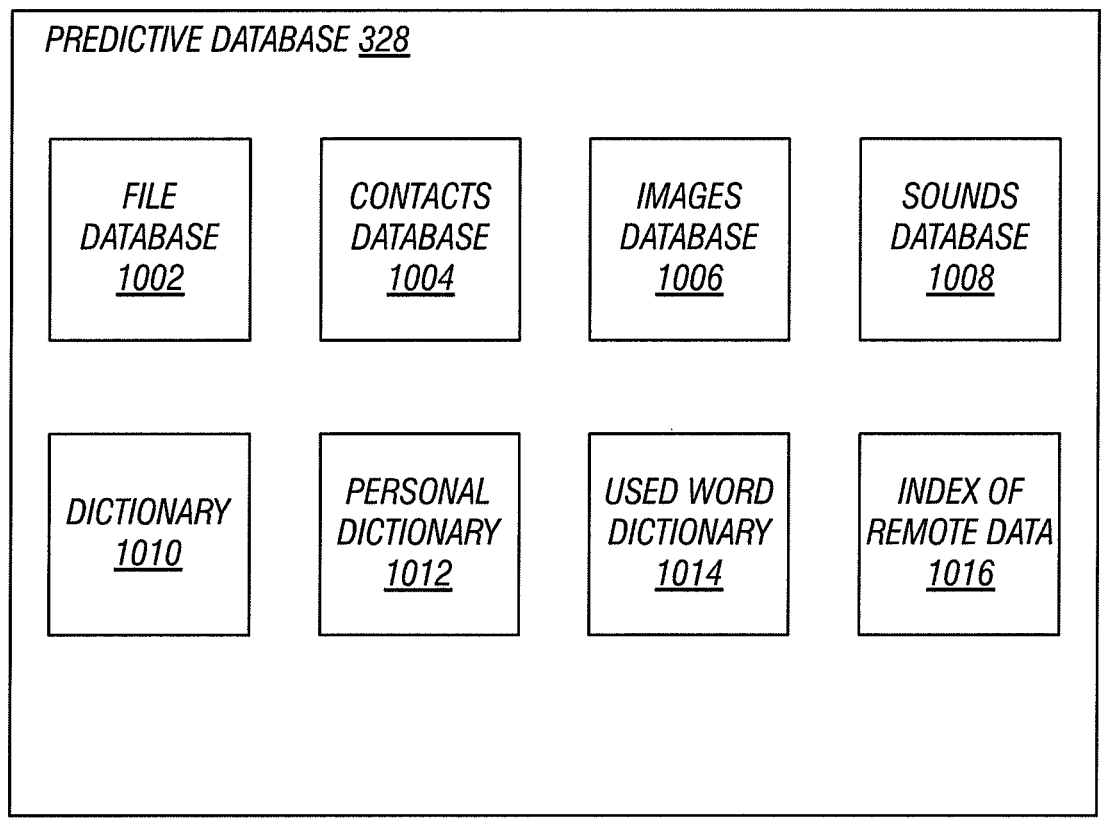
FIG. 10 shows a block diagram of a predictive database.

Text input logic 326 includes a collection of instructions and data which define the behavior of mobile telephone 100 in accepting textual data from a user. Such text entered by the user can be sent to another through text communication logic 324 or can be stored as a name of the owner of mobile telephone 100 or as a textual name to be associated with a stored telephone number. As described above, text input logic 326 can be used for a wide variety of applications other than text messaging between wireless devices. Predictive database 328 stores data which is used to predict text intended by the user according to pressed keys of input devices 308 in a manner described more completely below. Predictive database 328 is shown in greater detail as block diagram 328 (FIG. 10).

Logic flow diagram 400 (FIG. 4) illustrates behavior of the mobile telephone 100 (FIG. 3) according to text input logic 326 of this illustrative embodiment. In step 402, the text input logic sets asynchronous interrupt traps for a number of events such as receiving user input, receiving predictive analysis results, and expiration of a timer.

In step 404, text input logic 326 (FIG. 3) receives a character entered by the user by use of data input keys 106 (FIG. 1). In this illustrative embodiment, the user enters characters using conventional multi-tap techniques. Receipt of a character in step 404 corresponds to the beginning time 202 of the timeline 200 (FIG. 2).

In step 406, text input logic 326 (FIG. 3) begins predictive analysis. Once begun, text input logic 326 performs predictive analysis concurrently with the steps of logic flow diagram 400. In predictive analysis, text input logic 326 collects data previously entered by the user and predicts therefrom one or more additional characters, whole or partial words, and/or phrases intended by the user.

Text input logic 326 performs predictive analysis for the Chinese language in generally the manner described in the O'Dell Patent and that description is incorporated herein by reference. Predictive analysis can be performed in any of a number of ways for various languages. Generally, a dictionary stores a large collection of words and/or phrases representing the most likely things the user is expected to enter. As the user enters data, those words and/or phrases stored in the dictionary which match the entered data become fewer and fewer in number. Any such matching words and/or phrases are ranked accordingly to frequency of use such that the first element of the list of matching words and phrases is the most frequently used word or phrase of the list. In this illustrative embodiment, text input logic 326 expects words of the English language, and predictive data 328 stores words of the English language. In one embodiment, predictive analysis includes using relative frequency of appearance of bigrams, tri-grams, etc. to respectively predict second, third, etc. characters in the manner described in copending U.S. patent application Ser. No. S/N 10/360,537 by Roland Williams and Robert O'Dell entitled "Text Entry Mechanism for Small Keypads" dated Feb. 5, 2003 and that description is incorporated herein by reference.

In one embodiment, predicted candidates resulting from predictive analysis are only made available when predictive analysis completes. In an alternative embodiment, predictive analysis can make partial results available, generating one or more events to convey one or more corresponding parts of the complete set of results.

In step 408 (FIG. 4), text input logic 326 (FIG. 3) sets a timer to expire at time 206 (FIG. 2). Accordingly, text input logic 326 (FIG. 3) is initially set to trap expiration of time interval 204. As shown, the relative order of steps 406 and 408 is unimportant and, in fact, can be performed concurrently.

In step 410, text input logic 326 traps an asynchronous event. Asynchronous event traps are well-known and are not described further herein. In step 412, text input logic 326 (FIG. 3) determines the type of asynchronous event trapped in step 410. As described above, three types of asynchronous events are trapped in this illustrative embodiment: receiving user input, receiving predictive analysis results, and expiration of a timer. If the trapped asynchronous event is receipt of user input, i.e., detected pressing of any of data input keys 106, processing transfers to step 418. If the trapped asynchronous event is completion of predictive analysis as started in step 406, processing transfers to step 416. If the trapped asynchronous event is expiration of a timer, processing transfers to step 414.

Figure 4:
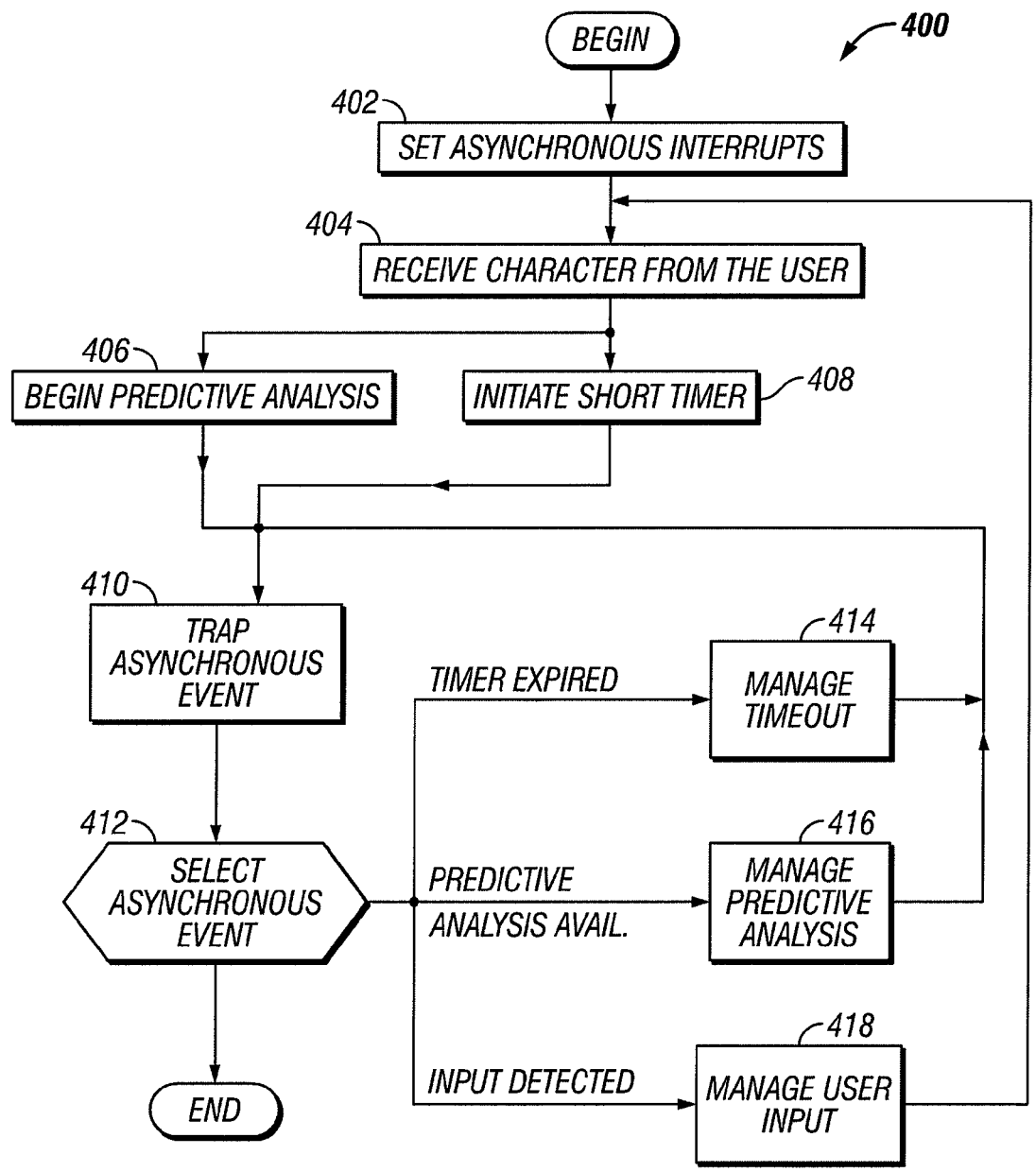
FIG. 4 shows a logic flow diagram of predictive analysis of input text.

Logic flow diagram 418 (FIG. 5) shows step 418 in greater detail. In step 502, text input logic 326 (FIG. 3) terminates predictive analysis that began in step 406 (FIG. 4). After step 502, processing according to logic flow diagram 418, and therefore step 418 (FIG. 4) completes. After step 418, processing by text input logic 418 transfers to step 404 in which the character entered by the user is received and thus to step 408 in which timers are reset such that timing diagram 200 (FIG. 2) is reset at time 202.

Figure 7:
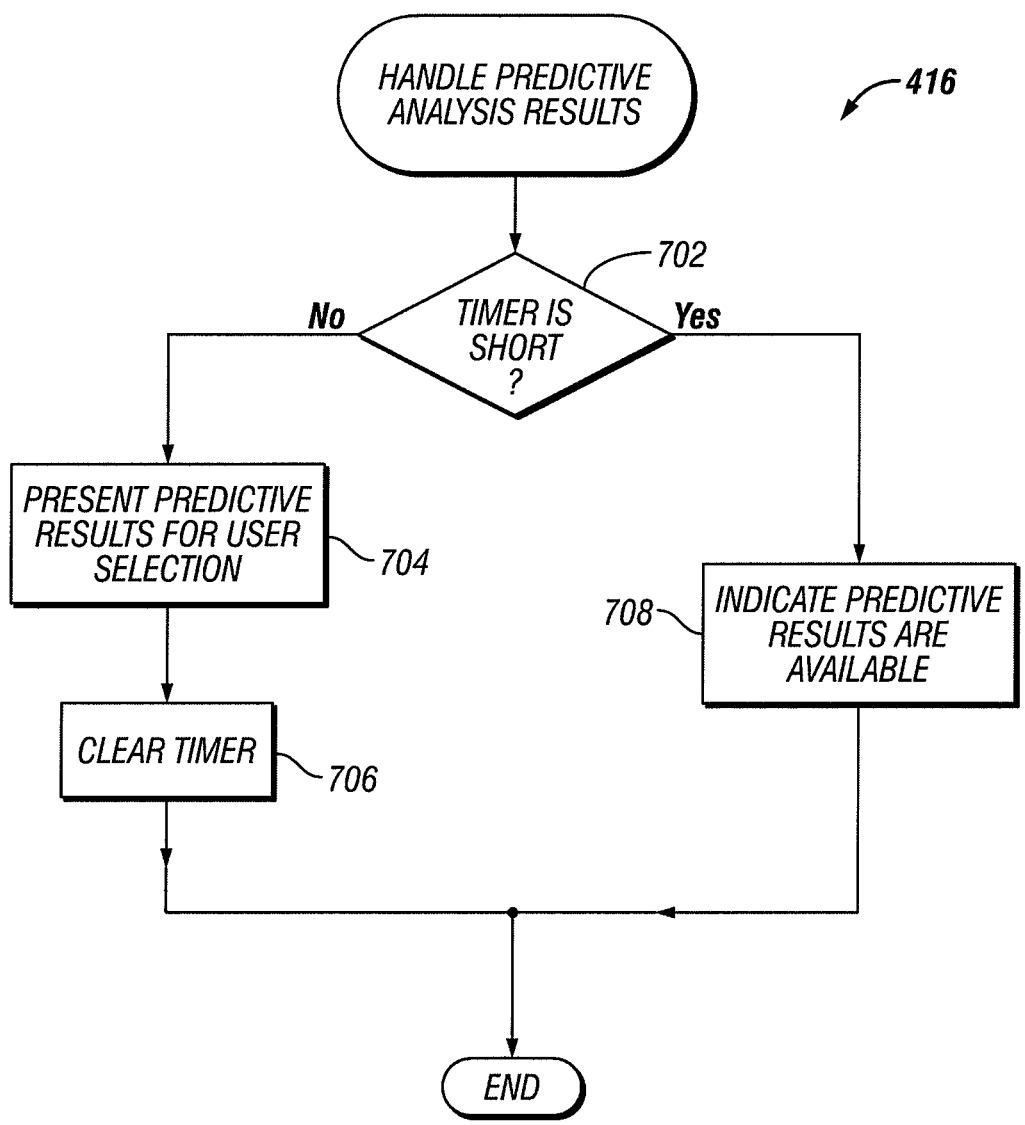
FIG. 7 shows a logic flow diagram of managing a predictive analysis result in predictive analysis of input text.

Step 416 (FIG. 4), in which text input logic 326 processes a trapped asynchronous timeout event, is shown in greater detail as logic flow diagram 416 (FIG. 7). Operations of timers and trapping asynchronous timeouts thereof are well known and are not described further herein.

In step 702, text input logic 326 (FIG. 3) determines if the timer is currently set to expire at time 206 (FIG. 2). If so, time 206 has not yet been reached and presentation of predictive analysis results is premature. However, if time 206 has already been reached, the timer is set to expire at time 210 as described more completely below. Therefore, if the timer is not set to expire at time 206, text input logic 326 (FIG. 3) determines that presentation of results of predictive analysis is now permitted and presents such results in step 704.

The results of predictive analysis can be presented to the user in various ways. In one embodiment, a list of predicted candidates, which are sorted in descending order of frequency of usage, is presented to the user and the user is free to select from the list, e.g., by using control keys 104, rather than continuing to specify individual characters, e.g., by using data input keys 106. In an alternative embodiment, the most frequently used predicted candidate is superimposed over text currently entered by the user. Pressing a selected one of control keys 104, the user can accept the superimposed predicted candidate. By pressing selected others of control keys 104, the user can scroll up and/or down a list of predicted candidates sorted by frequency of usage to switch which of the predicted candidates is superimposed over the text entered so far by user.

In step 706 (FIG. 7), text input logic 326 (FIG. 3) clears the timer such that termination of time-interval 208 is not trapped since termination of predictive analysis is no longer necessary. In an alternative embodiment in which partial results of predictive analysis are made available to the user, step 706 is skipped such that time 210 is recognized to enable termination of predictive analysis at time 210. In this alternative embodiment, text input logic 326 presents predicted candidates to the user in step 704 while predictive analysis continues if it has not yet completed. More results of predictive analysis can be made available to the user in subsequent performances of logic flow diagram 416 as such results become available during time-interval 208.

Through test step 702, text input logic 326 (FIG. 3) ensures that time 206 has been reached prior to presentation of predicted candidates to the user. In particular, if the timer is set to expire at time 206, time 206 has not yet been reached and step 704 is skipped. Thus, according to logic flow diagram 416, if time 206 has been reached when results of predictive analysis are available, such results are displayed for the user; and such results are not displayed if time 206 has not yet been reached.

Figure 15:
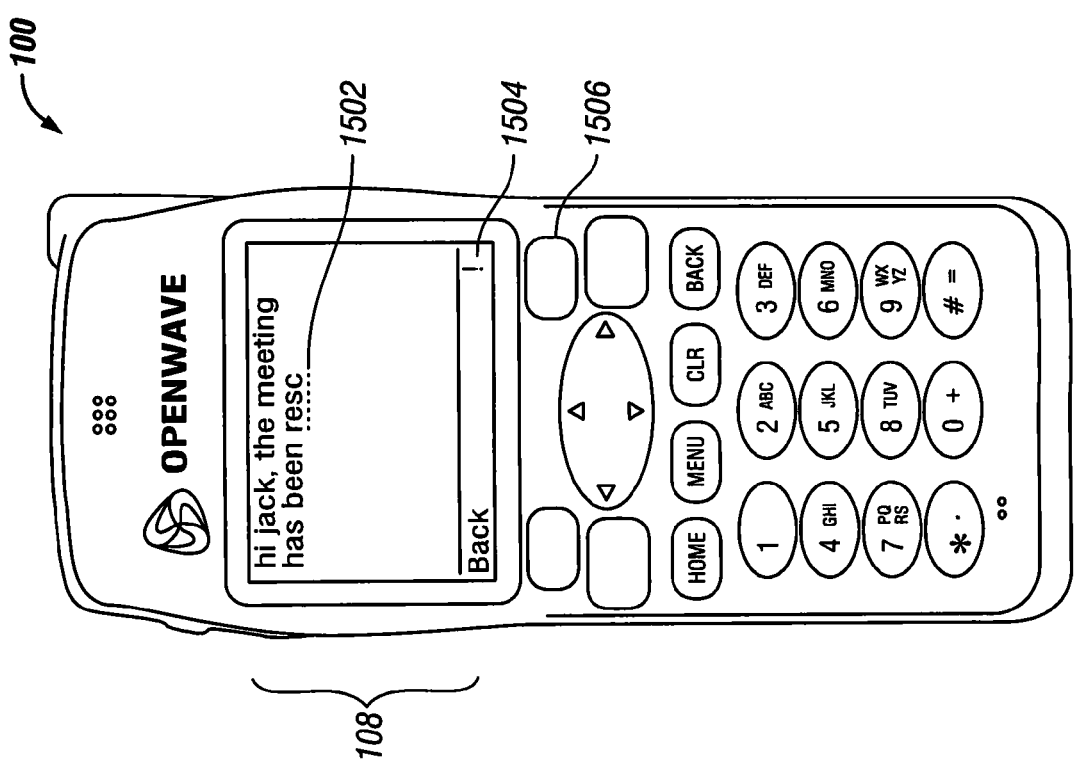
FIG. 15 shows a mobile telephone displaying a message in which a word is highlighted with a dotted underline to indicate the predicted candidates are available to the user in accordance with the present invention.

In the embodiment shown in FIG. 7, the availability of predicted candidates is indicated to the use in step 708 despite the fact that time 206 has not yet been reached. It is preferred that such indication be relatively subtle so as to not disrupt data entry by the user. An illustrative example of a relatively subtle indication is shown in FIG. 15. A dotted underline 1502 for the partial word, "resc," subtly indicates to the user that mobile telephone 100 has predicted candidates for completion of that partial word. Exclamation point 1504 is associated with soft button 1506 to suggest to the user that pressing soft button 1506 will allow the user to review and select from the predicted candidates. A soft button is a button whose function is dynamic. A soft button is typically associated with a dynamic function indicator such as the adjacent portion of display 108 in which exclamation point 1504 is displayed.

Figure 6:
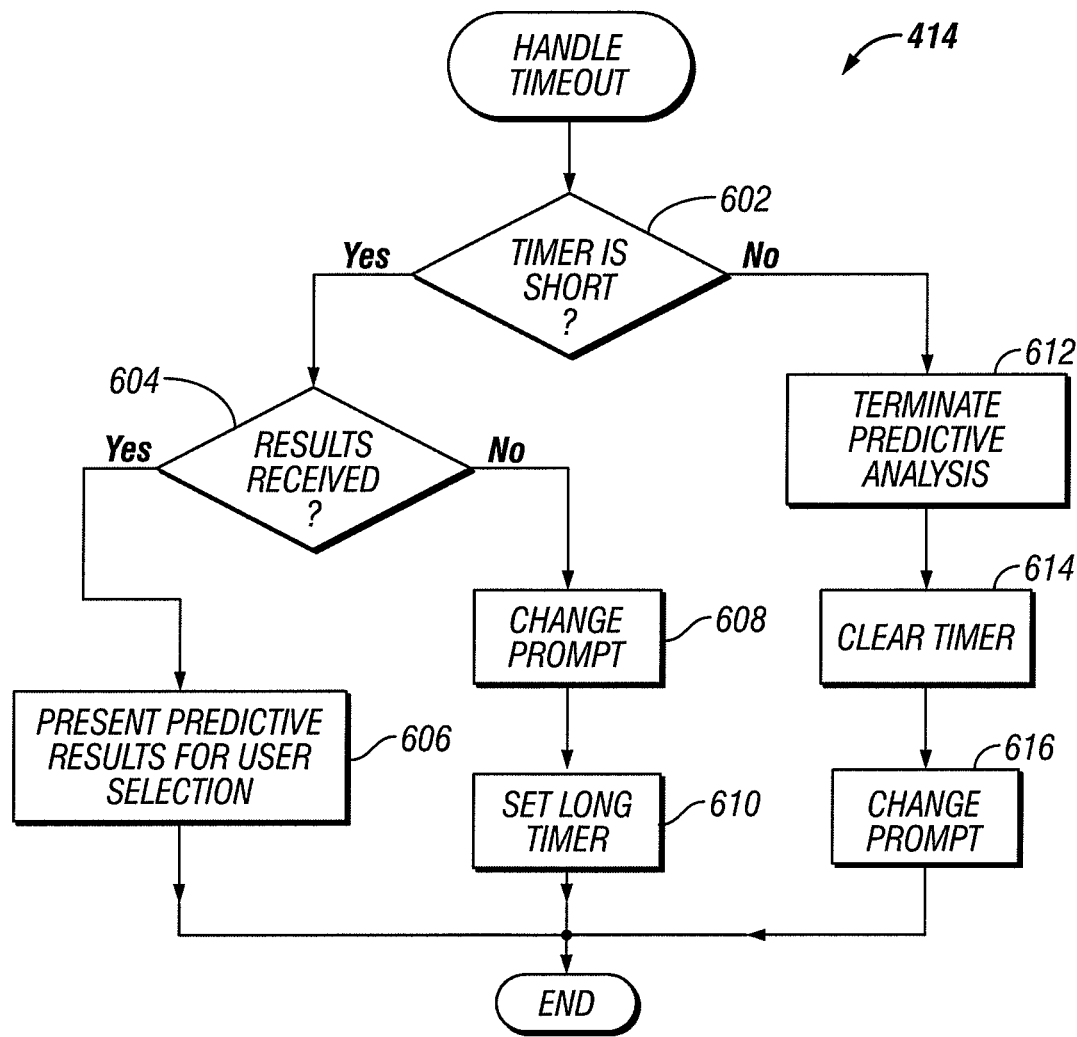
FIG. 6 shows a logic flow diagram of managing time-outs in predictive analysis of input text.

Step 414 (FIG. 4), in which text input logic 326 (FIG. 3) handles asynchronous timer expiration, is shown in greater detail as logic flow diagram 414 (FIG. 6). In test step 602, text input logic 326 (FIG. 3) determines whether the timer is set to expire at time 206 (FIG. 2) in the manner described above with respect to test step 702 (FIG. 7). If the timer is set to expire at time 206, processing transfers to test step 604. Conversely, if the time is set to expire at another time, e.g., time 210, processing transfers to step 612.

Initially, the timer is set to expire at time 206, so processing transfers to test step 604 in which text input logic 326 (FIG. 3) determines whether results of predictive analysis have been received. If so, processing transfers to step 606 in which the results are presented to the user in the manner described above. Conversely, if results of predictive analysis are not yet available, processing transfers from test step 604 to step 608.

In step 608, text input logic 326 (FIG. 3) changes a prompt or another aspect of display 108. Such informs the user that mobile telephone 100 is actively processing an implicit request to predict the data intended by the user. In this illustrative embodiment, text input logic 236 changes a cursor within display 108 from a static state to a blinking state in step 608. From the user's perspective, mobile telephone 100 has been awaiting data input during time interval 204 as indicated by a static cursor or similar aspect of information displayed in display 108. Unbeknownst to the user, mobile telephone 100 has been actively working at predicting intended data as begun in step 406. At time 206, a timer interrupt is handled in step 414 and, if no predictive analysis results are available at that time, a change in a passive state to an active state is indicated in display 108, e.g., by a blinking cursor. Thus, at time 206, the user perceives that mobile telephone 100 is actively processing data entered so far. This perception is reassuring to a user who has paused for the duration of time interval 204 either as a result of uncertainty as to how to continue data entry or as a result of intentionally triggering predictive analysis.

In step 610 (FIG. 6), text input logic 326 (FIG. 3) sets the timer to expire at time 210 (FIG. 2) since the next time to trap after time 206 is time 210.

If text input logic 326 (FIG. 3) determines in test step 602 that the timer is set to expire at time 210, e.g., by a previous performance of step 610, processing transfers to step 612. In step 612, text input logic 326 (FIG. 3) terminates predictive analysis. It should be noted that step 612 is only reached at time 210 when no results of predictive analysis are available or, alternatively, if predictive analysis has not completed by time 210 after presentation of partial predictive analysis results. In step 614, text input logic 326 (FIG. 3) clears the timer so no further timeout events will occur. In step 616, text input logic 326 (FIG. 3) changes the prompt, or another aspect of display 108, to indicate to the user a transition from an active state back to a passive state. Such communicates to the user that no predicted candidates of intended text are forthcoming.

After any of steps 606, 610, or 616, processing according to logic flow diagram 414, and therefore step 414 (FIG. 4), completes. After either of steps 414-416, processing according to logic flow diagram 400 transfers to step 410 in which the next asynchronous interrupt is trapped.

Figure 5:
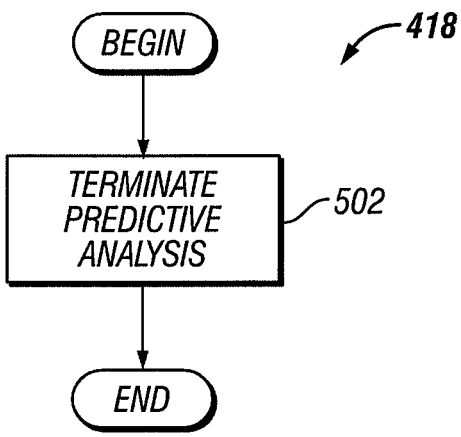
FIG. 5 shows a logic flow diagram of managing user input in predictive analysis of input text.

Text input logic 326 (FIG. 3) handles an asynchronous interrupt trap of receiving user input by managing user input in step 418. Step 418 is shown more completely as logic flow diagram 418 (FIG. 5). In step 502, text input logic 326 (FIG. 3) terminates predictive analysis started in step 406 (FIG. 4). After step 502, processing according to step 418 completes and processing transfers to step 404. Unlike steps 414-416, after which processing transfers to step 410 in which another asynchronous event is trapped, processing transfers from step 418 to step 404 to interpret the received data as a character of text input and the overall processing of logic flow diagram 400, as represented in timing diagram 200, restarts.

Figure 8:
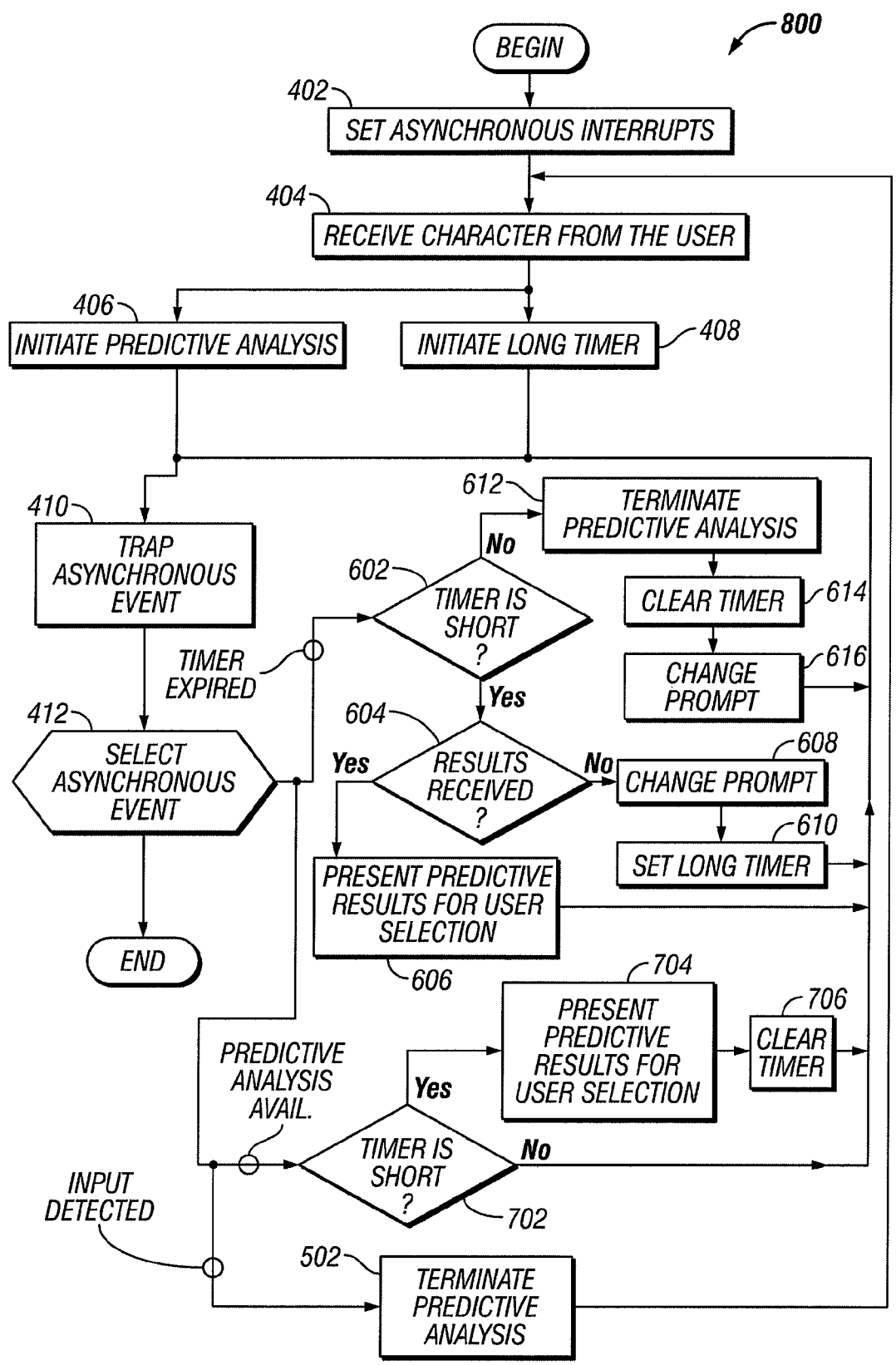
FIG. 8 shows a logic flow diagram of predictive analysis of input text.

Logic flow diagrams of FIGS. 4-7 are shown collectively for the reader's convenience in FIG. 8. FIGS. 11-14 illustrate an example of usage of mobile telephone 100 in accordance with the present invention. FIG. 11 shows display 108 of mobile telephone 100 (FIG. 1). User specification of text according to the present invention is described in the context of an illustrative example of the user specifying the word, "forward."

Display 108 is divided logically, i.e., by text input logic 326 (FIG. 3), into an upper portion—window 108B (FIG. 11)—and a lower portion—window 108A. Window 108A displays a current word, i.e., the word currently being specified by the user. Window 108B displays previously specified words which have been confirmed by the user and therefore appended to a current message which can include multiple words during the first time-interval 204 (FIG. 2). In an alternative embodiment, display 108 is not divided in this matter and individual characters specified by the user are displayed in the context of a message as entered by the user.

In this illustrative example, the user specifies the letter "f" using multi-tap user interface techniques, e.g., by pressing the "3" key three (3) times and pausing to confirm the specification of the letter "f." The results are shown in FIG. 11 in which the letter "f" is displayed in window 108A. In this illustrative example, the user has not previously specified any words so window 108B is empty.

In logic flow diagram 400 as shown in FIG. 8, text input logic 326 (FIG. 3) receives signals representing the letter "f" as entered by the user in step 404 and displays the letter "f" in window 108A (FIG. 11). In steps 406 and 408, text input logic 326 respectively begins predictive analysis and sets a timer to expire at time 206. In step 410, text input logic 326 traps the next asynchronous event. In this illustrative example, the user presses the "6" key of numeric keypad 106 prior to time 206 (FIG. 2). However, it is possible that predictive analysis completes prior to pressing of the "6" key by the user.

If predictive analysis does not complete prior to pressing of the "6" key by the user, the first asynchronous event trapped by text input logic 326 is detected input and processing accordingly transfers to step 502 in which any predictive analysis is terminated. From step 502, processing transfers to step 404 in which the input signals are interpreted as specification of one of the letters associated with the "6" key, namely, "m," "n," or "o." Once any of data input keys 106 is pressed by the user, multi-tap techniques are employed to determine which letter is intended by the user. Thus, in this illustrative embodiment, the user presses the "6" key thrice without a significant pause to indicate the letter "o" is intended.

Suppose, however, for illustration purposes that predictive analysis completes prior to pressing the "6" key by the user. In this scenario, the first trapped asynchronous event is the completion of predictive analysis by text input logic 326. Accordingly, processing transfers to step test step 702 (FIG. 8). Since time 206 has not yet been reached, the timer is set to expire at time 206 and processing transfers from test step 702 to step 410, bypassing step 704 such that results of predictive analysis are not displayed in window 108A (FIG. 12). In step 410, the next asynchronous event is trapped.

In this illustrative example, the next asynchronous event is detection of input signals prior to time 206. Thus, processing transfers to step 502 in which the data input signals are processed in the manner described above. As a result, no predictive results are presented despite completion of predictive analysis. Whether predictive analysis completes prior to user input or subsequently, results of predictive analysis are not shown prior to time 206.

Continuing in this illustrative embodiment, the user enters another character resulting in the view shown in FIG. 13. Subsequent to receipt of the letter "r" as shown, the user does not press any keys of mobile telephone 100 prior to time 206. Therefore, a number of possible sequences of events are possible. In one sequence, predictive analysis results are available prior to time 206. In another sequence of events, predictive analysis results become available after time 206 and prior to time 210. In a third sequence of events, predictive analysis results are not available at time 210.

In the first sequence of events, predictive analysis results are available prior to time 206. The first event trapped is completion of predictive analysis and, since time 206 has not yet been reached, processing transfers through test step 702 to step 410 in the manner described above. The second event trapped is a timeout event at time 206 and processing transfers from step 410 to test step 602. In test step 602, text input logic 326 determines whether the timer is set to expire at time 206 or at time 210. Since the timer is set to expired at time 206, processing transfers to test step 604 and therefrom to step 606 since predictive analysis results are available. In step 606, test input logic 326 presents predicted candidates for selection by the user in the manner described above. Such is shown in FIG. 14 in which text input logic 326 has predicted that the user intends to enter the word "forward." The user is free to select this predicted word and add it to text in window 108B in the manner described above. If the user does so, the next event trapped in step 410 is user input and processing transfers to step 404.

In the second sequence of events, predictive analysis results become available after time 206. Accordingly, the first event trapped is a timeout at time 206. Processing transfers from step 410 to test step 602. Since the timer is set to expire at time 206, processing transfers to test step 604. Since no predictive analysis results are available, i.e., predictive analysis continues, processing transfers to step 608 in which text input logic 326 changes the prompt or another aspect of display 108 to indicate a transition from a passive state to an active state. In step 610, text input logic 326 sets the timer to expire at time 210 such that the next timer-related event to be trapped is expiration of time interval 208.

The next event to be trapped in step 410 in this illustrative example is completion of predictive analysis. Accordingly, processing transfers to test step 702 and therethrough to step 704 since the timer is now set to expire at time 210. In step 704, text input logic 326 presents results of predictive analysis to the user for selection and the timer is cleared in step 706. Accordingly, the user can select from among the predicted candidates and the timer will no longer generate an asynchronous event which could interrupt browsing and selection of predicted candidates by the user.

In the third sequence of events, predictive analysis results are not available at time 210. In the manner described above, the first event trapped is a timeout which causes processing to include steps 602, 604, 608, and 610. In step 610, the timer is set to expire at time 210. Since results of predictive analysis are not available at time 210 in this illustrative sequence of events, the next event trapped at step 410 is another timeout event. From test step 602, processing transfers to step 612 since the timer is set to expire at time 210.

In step 612, text input logic 326 terminates predictive analysis. In step 614, text input logic 326 clears the timer so no further timeout events occur until user input is detected, thereby causing another performance of step 408. In step 616, text input logic 326 changes the prompt or another aspect of display 108 to indicate to the user a change from an active state to a passive state such that the user understands that predictive analysis results are not forthcoming.

The benefits of the system described above with respect to text entry are also applicable to specification of other types of data. For example, a user can enter data representing a file stored within mobile telephone 100, a contact stored within a contacts database within mobile telephone 100, an image, or a sound. In some embodiments, the type of data which can be specified by the user is clear and unambiguous. In another embodiment, various contexts of data input are implemented and each context can have two or more valid data types. For example, in the context of composing a text message, valid types can include all those listed above, namely, filenames, contacts, images, and sounds. In the body of a text message, the user can identify a contact to (i) address the message to the contact or (ii) to attach a v-card representing, identified contact information to the message. Similarly, specifying an image, a sound, or any other file stored in mobile telephone 100 in the body of a message enables attachment of the corresponding file to the message. In addition, the user can enter ordinary words in the manner described above.

To support various types of data specified by a user, predictive database 328 includes various databases 1002-1012 (FIG. 10). File database 1002 includes data specifying files stored within mobile telephone 100. Contacts database 1004 includes data specifying contact information, e.g., telephone numbers, addresses, e-mail addresses, and various message service addresses, of individuals whom the user may wish to contact. Images database 1006 includes data specifying information about various images stored within mobile telephone 100. Sounds database 1008 includes data specifying information about various sounds stored within mobile telephone 100, including ring tones, for example.

In addition, predictive database 328 includes a dictionary 1010 of the English language such that text input logic 326 (FIG. 3) can accurately predict words of the English language intended by the user during text input in the manner described above. Predictive database 328 also includes (i) a personal dictionary 1012 which includes words specific to the user, i.e., proper nouns and slang frequently used by the user or stored in a contacts database used by the user and (ii) a used words dictionary 1014 which specifies words previously entered by the user such that words entered by the user which are not represented within dictionary 1010. Accordingly, text input logic 326 (FIG. 3) can accurately predict non-standard words entered by the user, including slang terms, neologies, and proper nouns for example. Used words dictionary 1014 is used in conjunction with databases 1002-1012 to order predicted candidates according to frequency and/or recency of use by the user. Thus, predictive behavior adapts to the specific data entry habits of the specific user.

Index of remote data 1014 includes references to data similar to data stored in databases 1002-1012 and which is accessible through a network. For example, contact data can be retrieved from known and conventional LDAP WAP or web servers. Similarly, sounds such as ring tones and music in the known and ubiquitous MP3 format and be made available through wireless Internet servers and cataloged and referenced within index of remote data 1014.

Figure 9:
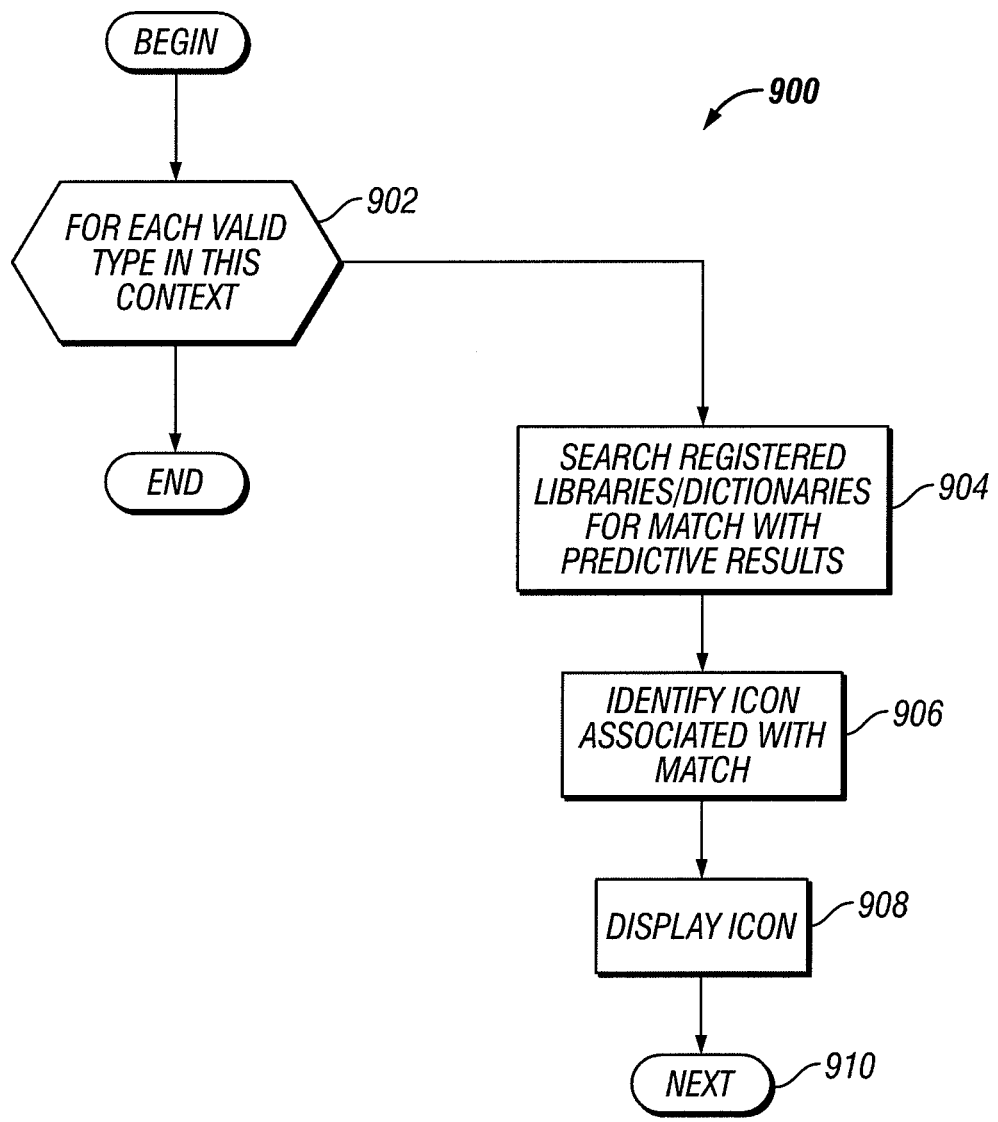
FIG. 9 shows a logic flow diagram of presenting predictive results for selection by a user.

Text input logic 326 predicts data intended by the user when implementing multiple data types in the manner shown in logic flow diagram 900 (FIG. 9). Loop step 902 and next step 910 define a loop in which each of the databases 1002-1014 which are valid in the current context. The context is determined by the type of task currently being performed by mobile telephone 100. If the user is specifying the intended recipient of a text message, only contacts database 1004 is valid. During composition of the body of a text message, all databases 1002-1014 are valid. During each iteration of the loop of steps 902-910, the particular database processed according to steps 904-908 is referred to as the subject database.

In step 904, text input logic 326 identifies entries in the subject database which match one or more characters recently specified by the user. In step 906, text input logic 326 identifies a graphical icon that is associated with the subject database. For example, a file can be associated with a file icon; an image can be associated with an image icon or a thumbnail of the image itself; a sound can be associated with a musical note icon; and a contact can be associated with an index card icon. In step 906, text input logic 326 associates the graphical icon with a textual representation of each of the entries. Accordingly, subsequent presentation of any of the entries as results of predictive analysis, e.g., in steps 606 or 704, can cause the associate icon to be displayed in conjunction with the textual description. Thus, the user can readily determine the type of data item predicted by text input logic 326. For example, an associated icon can indicate to the user whether a predicted candidate whose textual description is "jack" is a contact, an image, a sound, or a word.

Figure 16:
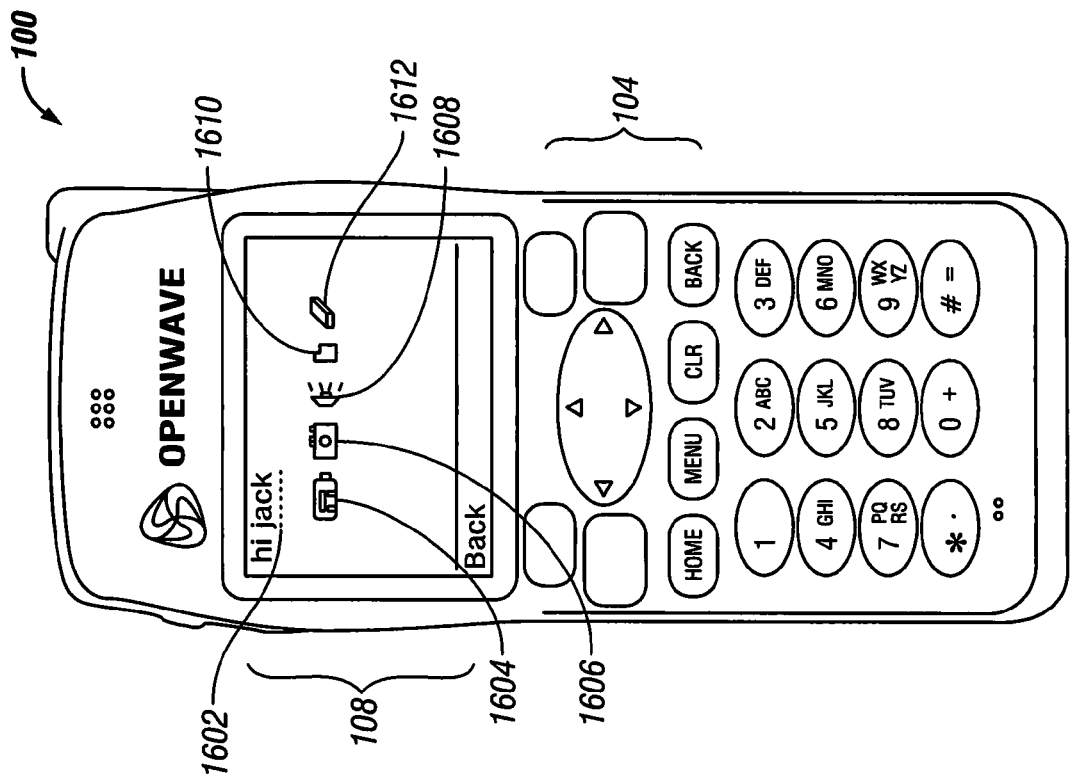
FIG. 16 shows a mobile telephone displaying a message in which predicted candidates for multiple data types are available to the user in accordance with the present invention.

The result of processing according to logic flow diagram 900 is shown in FIG. 16. In display 108, the word, "jack," is highlighted with a dotted underline 1602 to indicate that predicted candidates are available for that word. Display 108 also includes icons 1604-1612, displayed in respective performances of step 908 (FIG. 9), to indicate the various types of predicted candidates which are available for "jack" in the context shown in FIG. 16. Specifically, (i) icon 1604 is a Rolodex® style card to represent contact information associated with "jack," (ii) icon 1606 is a camera to represent one or more graphical images associated with "jack," (iii) icon 1608 is a speaker to represent one or more sounds associated with "jack," (iv) icon 1610 is document icon to represent one or more data files associated with "jack," and (v) icon 1612 is a book to indicate one or more words which begin with "jack." Thus, by using control keys 104, the user can select from the various data types represented by icons 1604-1620 to select the type of data indicated by the entered text, "jack."

For example, the user can highlight and select icon 1604 to indicate that "jack" refers to contact information, e.g., of a person. Upon such selection, mobile telephone 100 allows the user to select from one or more contact records associated with "jack." Once such a record is selected, actions can be associated with contacts and can be initiated by the user. One such action can be to address the current message currently being composed and shown in display 108 to the entity represented by the selected contact record. Another such action is to associate a v-card data item representing the selected contact record for attachment to the current message.

Other actions can be associated with other data types. Sounds in a message can be embedded in the message such that the sound plays when the message is displayed or can be attached as a sound data file. Images can be embedded in the message such that the image is a displayed component of the message itself or can be attached as an image data file. A data file can be attached to the message or the contents of the data file can be imported into the body of the message.

The above description is illustrative only and is not limiting. For example, while text messaging using a wireless telephone is described as an illustrative embodiment, it is appreciated that text entry in the manner described above is equally applicable to many other types of text entry. Wireless telephones use text entry for purposes other than messaging such as storing a name of the wireless telephone's owner and associating textual names or descriptions with stored telephone numbers. In addition, devices other than wireless telephones can be used for text messaging, such as two-way pagers and personal wireless e-mail devices. Personal Digital Assistants (PDAs) and compact personal information managers (PIMs) can utilize text entry in the manner described here to enter contact information and generally any type of data. Entertainment equipment such as DVD players, VCRs, etc. can use text entry in the manner described above for on-screen programming or in video games to enter names of high scoring players. Video cameras with little more than a remote control with a numeric keypad can be used to enter text for textual overlays over recorded video. Text entry in the manner described above can even be used for word processing or any data entry in a full-sized, fully-functional computer system.

Therefore, this description is merely illustrative, and the present invention is defined solely by the claims which follow and their full range of equivalents.

What is claimed is:

1. A computer implemented text entry process, comprising operations of:

via reduced keypad containing multiple data entry keys, receiving entry of user input including a sequence of data entry key presses, where at least some of the data entry keys concurrently represent three or more characters;

searching a dictionary for entries consistent with characters indicated by the user input received so far, the searching operation beginning substantially immediately in response to an initial one of the data entry key presses and continuing during subsequent data entry key presses;

where:
the searching operation additionally includes searching multiple databases for database entries consistent with characters indicated by the user input received so far, where each database comprises text entries identifying a different type of computer-readable object associated with that database;

associating the dictionary and each database with different predetermined icons;

utilizing a human-readable display to automatically present entries found by the searching operation comprising utilizing the display to present a prescribed feature signifying that entries resulting from the search are available for presentation by presenting selected ones of the predetermined icons, the selected ones including any icon associated with any vocabulary or databases from which the searching operation successfully found any entries; and suppressing presentation of any entries found by the searching operation until a first predetermined period elapses from a most recent one of the data entry key presses.

2. The process of claim 1, where the text entry process is being conducted in furtherance of a current one of multiple computer-implemented tasks, and where the searching or presenting operations are limited to one or a combination of the following associated with the current task: the dictionary, one or more of the databases.

3. The process of claim 2, where:

one of the databases contains a list of contacts;

responsive to a current task involving user entry of an intended text message recipient, limiting the searching or presenting operations to the list of contacts;

responsive to a current task involving composition of a text message body, leaving searching and presenting operations open to the dictionary and all of the databases.

4. A non-transitory computer readable medium encoded with a program executable by a digital data processor to perform the operations of any of claim 2 or 3.

5. A text entry system, comprising: a reduced keypad containing multiple data entry keys; a human-readable display; digital data storage;

and a processor coupled to the keypad, display, and storage, the processor programmed to perform the operations of any of claim 2, or 3.

* * * * *